(12) United States Patent
Chen et al.

(10) Patent No.: US 8,559,280 B2
(45) Date of Patent: Oct. 15, 2013

(54) OPTICAL DISK DRIVE AND METHOD FOR DATA RECORDING OF OPTICAL DISK DRIVES

(75) Inventors: Hsin-Cheng Chen, Tainan County (TW); Chao-Yi Wu, Kaohsiung County (TW); Chia-Hung Lee, Taipei County (TW); Yao-Chun Fang, Tainan County (TW)

(73) Assignee: Mediatek Inc., Hsin-Chu (TW)

( * ) Notice: Subject to any disclaimer, the term of this patent is extended or adjusted under 35 U.S.C. 154(b) by 1002 days.

(21) Appl. No.: 12/413,982

(22) Filed: Mar. 30, 2009

(65) Prior Publication Data
US 2009/0323487 A1 Dec. 31, 2009

Related U.S. Application Data

(60) Provisional application No. 61/076,249, filed on Jun. 24, 2008, provisional application No. 61/095,014, filed on Sep. 8, 2008.

(51) Int. Cl.
*G11B 21/08* (2006.01)

(52) U.S. Cl.
USPC ........................................ 369/30.21

(58) Field of Classification Search
None
See application file for complete search history.

(56) References Cited

U.S. PATENT DOCUMENTS

| 5,184,341 A | 2/1993 | Hamasaka et al. |
| 8,000,190 B2 * | 8/2011 | Hosono et al. ............. 369/47.15 |
| 2006/0133245 A1 * | 6/2006 | Saeki ........................... 369/53.1 |
| 2010/0302919 A1 | 12/2010 | Ling et al. |

FOREIGN PATENT DOCUMENTS

TW 200816188 4/2008

* cited by examiner

*Primary Examiner* — Joseph Feild
*Assistant Examiner* — Parul Gupta
(74) *Attorney, Agent, or Firm* — McClure, Qualey & Rodack, LLP

(57) ABSTRACT

The invention provides a method for data recording of an optical disk drive. First, raw data is encoded to obtain a plurality of recording units of encoded data to be stored in a memory. The encoded data stored in the memory is then recorded to an optical disk. A predetermined number of recording units of the encoded data is then reserved in the memory as reserved data without being recorded onto the optical disk. The recorded data read from the optical disk is then compared to the corresponding encoded data stored in the memory to verify correctness of the recorded data. The reserved data is then recorded to the optical disk after correctness verification of the recorded data is completed. Finally, the aforementioned steps are repeated until there is no more raw data left as a source for encoding.

10 Claims, 7 Drawing Sheets

OPTICAL DISK DRIVE AND METHOD FOR DATA RECORDING OF OPTICAL DISK DRIVES

CROSS REFERENCE TO RELATED APPLICATIONS

This application claims the benefit of U.S. Provisional Application No. 61/076,249, filed on Jun. 27, 2008, and U.S. Provisional Application No. 61/095,014, filed on Sep. 8, 2008, the entirety of which are incorporated by reference herein.

BACKGROUND OF THE INVENTION

1. Field of the Invention

The invention relates to optical disk drives, and more particularly to data recording of optical disk drives.

2. Description of the Related Art

In addition to reading data from an optical disk, an optical disk drive is required to be capable of recording data on an optical disk. The efficiency of data recording is therefore a determinant factor of performance of an optical disk drive. When an optical disk drive records a greater amount of data to an optical disk within a shorter time period, the optical disk drive is deemed to have a better performance. Thus, one objective for an optical disk drive is to reduce the required time for recording data as much as possible.

Referring to FIG. 1, a schematic diagram of a conventional recording process is shown. A conventional recording process of an optical disk drive comprises a recording-target seek step, a recording step, a verifying-target seek step, and a verifying step. The optical disk drive first encodes a first raw data segment to obtain a first encoded data segment. The optical disk drive then moves a pickup head to a write target position A1 of an optical disk at a recording-target seek step (a), and then starts to record the first encoded data segment on the optical disk to obtain the recorded data 1 by moving the pickup head to the position A2 at a recording step (b) shown in FIG. 1. When recording of the first encoded data segment is completed, the optical disk drive moves the pickup head back to the write target position A1 at the verifying-target seek step (c), and then compares the recorded data 1 read from the optical disk with the first encoded data segment at a verifying step (d) to verify correctness of the recorded data 1. Thus the recording process corresponding to the first raw data segment is completed. The optical disk drive then encodes a second raw data segment to obtain a second encoded data segment, and repeats the steps (a) to (d) for the second encoded data segment to obtain recorded data 2 between positions A2 and A3, thus completing a second iteration of the conventional recording process.

In FIG. 1, because the optical disk drive requires extra time for encoding the second encoded data segment, the pickup head drifts away from the position A2 during encoding of the second encoded data segment and must be moved to the write target position A2 at a recording-target seek step (e) before the second encoded data segment is recorded with the recorded data 2 at a recording step (f). Because moving of the pickup head wastes a lot of time, if the optical disk drive generates the second encoded data segment before verification of the first recorded data segment is completed at step (d), the second encoded data segment can be directly recorded onto the optical disk without moving the pickup head after verification of the first recorded data segment is completed, which is referred to as a seamless-verify-write process. Thus, a seamless-verify-write method for data recording of an optical disk drive without the aforementioned deficiencies is required.

BRIEF SUMMARY OF THE INVENTION

The invention provides an optical disk drive. In one embodiment, the optical disk drive comprises an encoder, a verify unit, and a control unit. The encoder encodes raw data received from a host to obtain encoded data. After the encoded data is recorded onto an optical disk, the verify unit compares the recorded data read from the optical disk with the encoded data to identify recording errors. The control unit reserves at least one recording unit of the encoded data as reserve data without being recorded onto the optical disk when a prior segment of the encoded data is recorded, and records the reserved data onto the optical disk as an initial portion of a subsequent segment of the encoded data after reading of a prior segment of the recorded data is completed.

The invention provides a method for data recording of an optical disk drive. First, raw data is encoded to obtain a plurality of recording units of encoded data to be stored in a memory. The encoded data stored in the memory is then recorded to an optical disk. A predetermined number of recording units of the encoded data is then reserved in the memory as reserve data without being recorded onto the optical disk. The recorded data read from the optical disk is then compared to the corresponding encoded data stored in the memory to verify correctness of the recorded data. The reserved data is then recorded to the optical disk after correctness verification of the recorded data is completed. Finally, the aforementioned steps are repeated until there is no more raw data left as a source for encoding.

The invention further comprises a method for data recording of an optical disk drive. First, raw data is encoded to obtain a plurality of recording units of encoded data to be stored in a memory. The encoded data stored in the memory is then recorded onto an optical disk except for a reserved portion of the encoded data. The encoded data is then released from the memory except for the reserved portion. In one embodiment, the data amount of the reserved portion is equal to a segment of previously encoded data obtained from a pre-encoding process or left without being recorded in a previous recording process.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
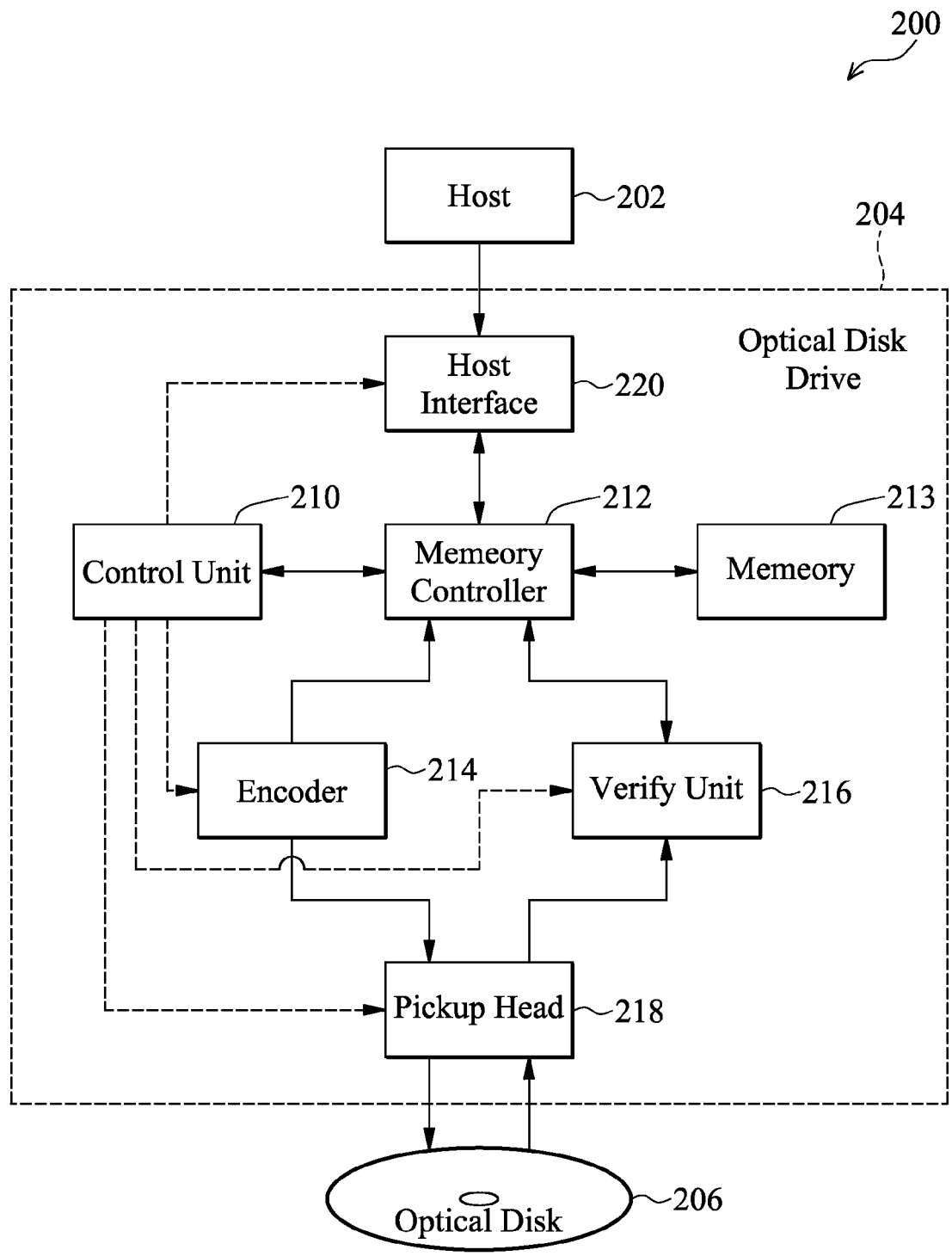
FIG. 2 is a block diagram of an optical disk drive according to the invention.

Referring to FIG. 2, a block diagram of an optical disk drive 204 according to the invention is shown. An optical disk 206 is inserted into the optical disk drive 204 for data recording. In one embodiment, the optical disk drive 204 comprises a control unit 210, a memory controller 212, a memory 213, an encoder 214, a verify unit 216, a pickup head 218, and a host interface 220. The control unit 210 controls operations of all other component units of the optical disk drive 204. The memory controller 212 handles access of the memory 213 from other component units of the optical disk drive 204. In one embodiment, the memory 213 is a dynamic random access memory (DRAM), a static random access memory (SRAM), or a flash memory. When a host 202 derives the optical disk drive 204 to record data on the optical disk 206, the host 202 transmits raw data to the host interface 220. In one embodiment, the host interface 220 is a Serial Advanced Technology Attachment (SATA) interface.

The encoder 214 then encodes raw data received by the host interface 220 to generate encoded data, and the memory controller 212 then stores the encoded data in the memory 213. In one embodiment, the encoder 214 comprises an interleaving unit for interleaving the encoded data. After an encoded data segment is ready in the memory 213, the control unit 210 then drives the pickup head 218 to move to a write target position of the optical disk 206, and then drives the pickup head 218 to record the encoded data segment to the optical disk 206. The control unit 210, however, does not record all encoded data stored in the memory 213 to the optical disk 206 right away. On the contrary, the control unit 210 drives the pickup head 218 to reserve at least one recording unit of the encoded data in the memory 213 as reserved data without being recorded onto the optical disk 206. The recording unit is a basic data unit for recording and referred to as an error-correction-code (ECC) cluster for a blu-ray disk (BD), a sector for a compact disk (CD), and an error-correction-code (ECC) block for a digital versatile disk (DVD) or a high-density digital versatile disk (HD-DVD). Thus, the memory 213 comprises a portion of encoded data which has been recorded to the optical disk 206 and another portion of encoded data which has not been recorded. The portion of encoded data which has not been recorded is referred to as reserved data.

The control unit 210 then drives the pickup head 218 to move back to the write target position, and then drives the pickup head 218 to read recorded data from the optical disk 206. The verify unit 216 then compares the recorded data read from the optical disk 206 with the encoded data stored in the memory 213 to verify correctness of the recorded data. The memory 213 clears the encoded data after the corresponding recorded data is verified. After the verify unit 216 completes correctness verification of the recorded data, the pickup head 218 is moved to an endpoint of the previous recorded data, wherein the endpoint of the previous recorded data is also a write target position corresponding to a next recording iteration. The control unit 210 then drives the pickup head 218 to immediately record the previously reserved data onto the optical disk 206 as an initial portion of a subsequent encoded data segment without delay.

Because the amount of the reserved data is greater than a basic recording unit, recording of the reserved data is absolutely practicable. Because the pickup head 218 immediately records the reserved data to the optical disk 206 after the pickup head 218 reads an endpoint of the previous recorded data from the optical disk 206, position of the pickup head 218 does not need to be adjusted for seeking a start point of next recorded data, and a total time required by the whole recording process is therefore reduced to improve performance of the optical disk drive 204. The encoder 214 then encodes raw data newly received from the host 202 to obtain a later portion of the subsequent encoded data segment, and the pickup head 218 can then continue to record the later portion of the subsequent encoded data segment after recording of the reserved data is completed.

Figure 3A:
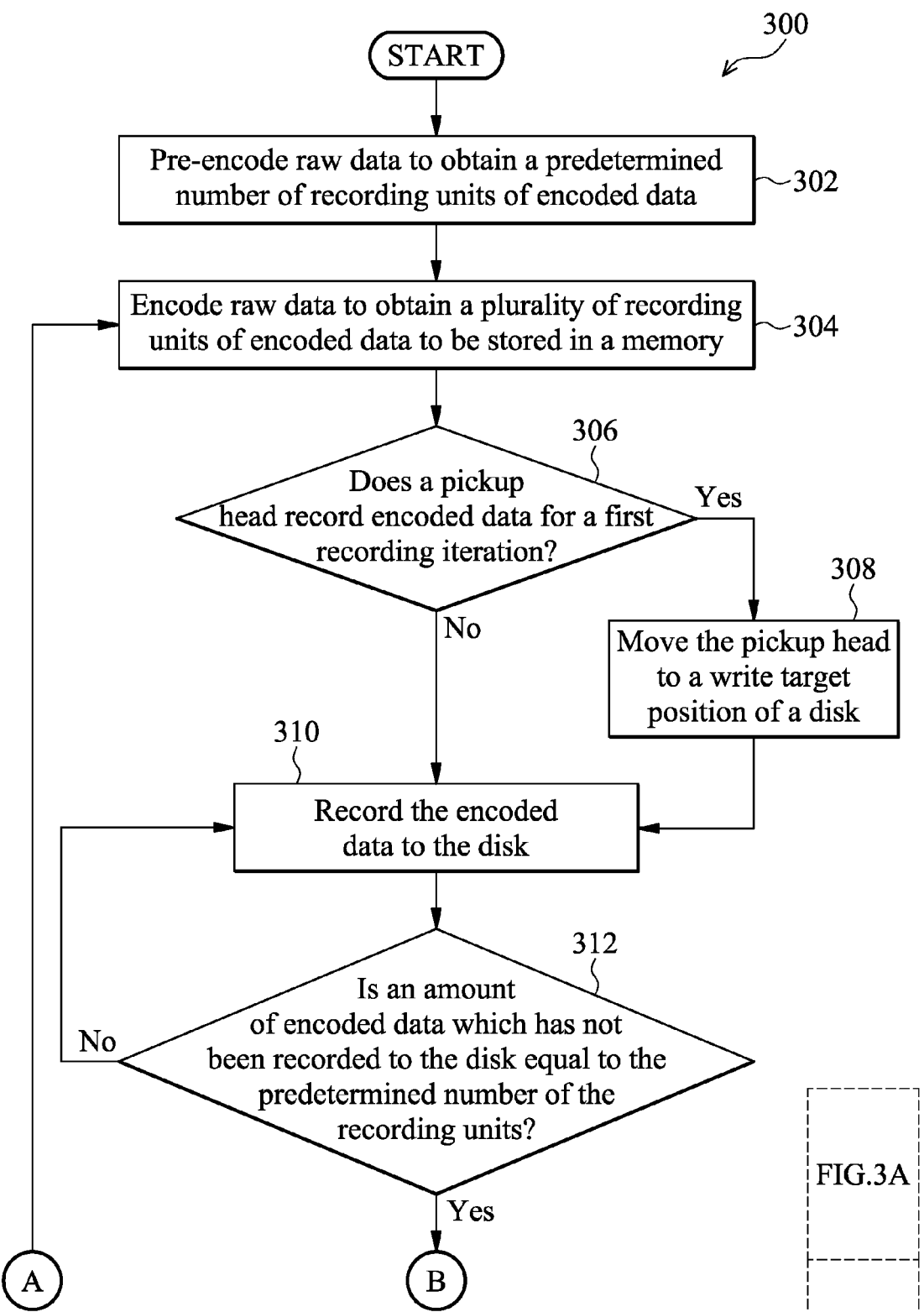
FIG. 3 is a flowchart of a method for data recording of an optical disk drive according to the invention.
Figure 3B:
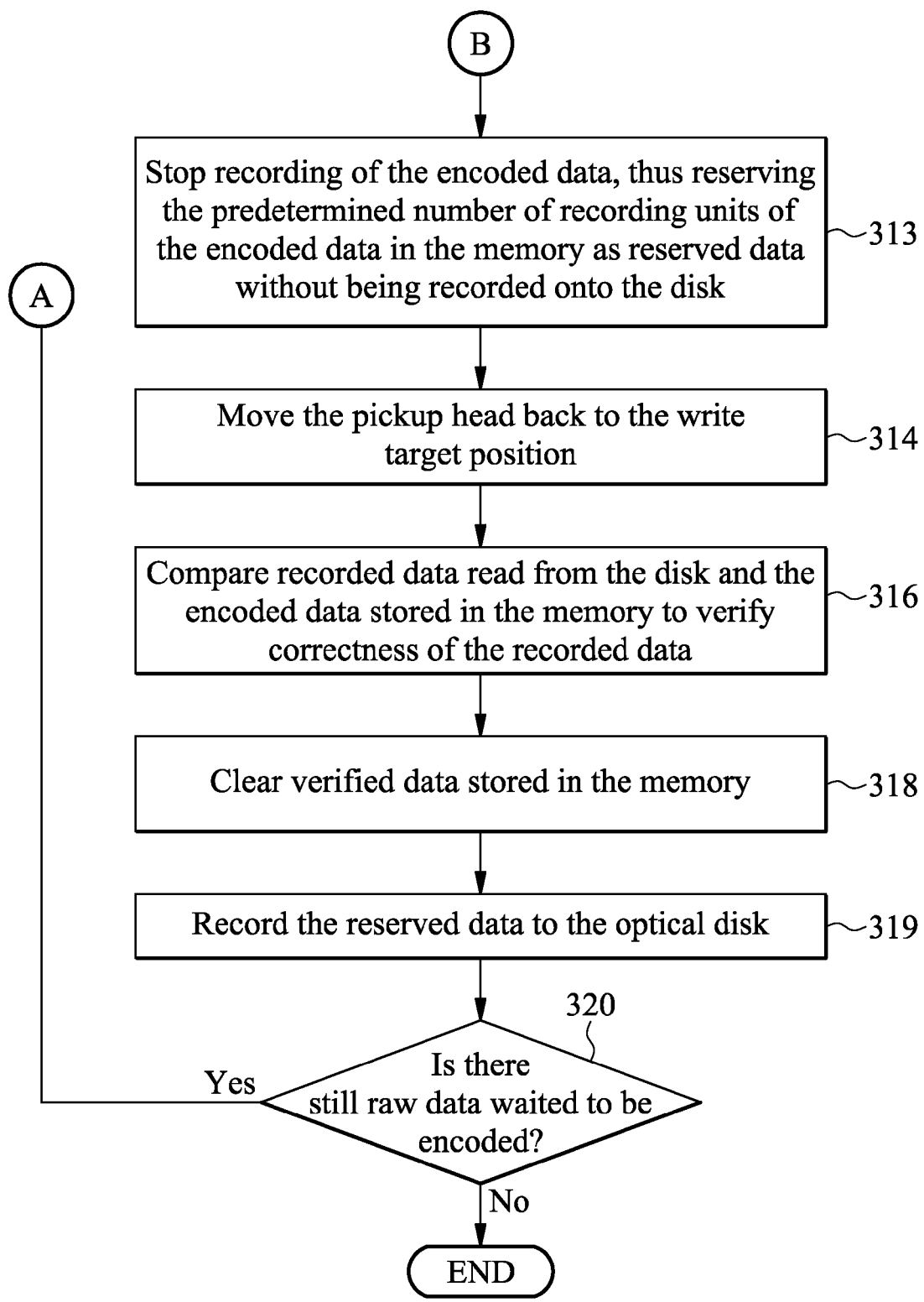

Referring to FIG. 3, a flowchart of a method 300 for data recording of the optical disk drive 200 according to the invention is shown. The host interface 220 first receives raw data from the host 202. The encoder 214 then pre-encodes raw data to obtain a predetermined number of recording units of encoded data (step 302), wherein 'pre-encode' here means encoding of raw data in advance of a normal encoding process of step 304. The encoder 214 then continues to encode raw data to obtain a plurality of recording units of encoded data (step 304). The encoded data obtained at steps 302 and 304 is then stored in the memory 213 as reserved data.

It should be noted that although a portion of the reserved data is obtained in the pre-encoding step 302 in the aforementioned embodiment, the reserved data can also be a segment of previously encoded data without being recorded in a previous recording process.

Figure 4:
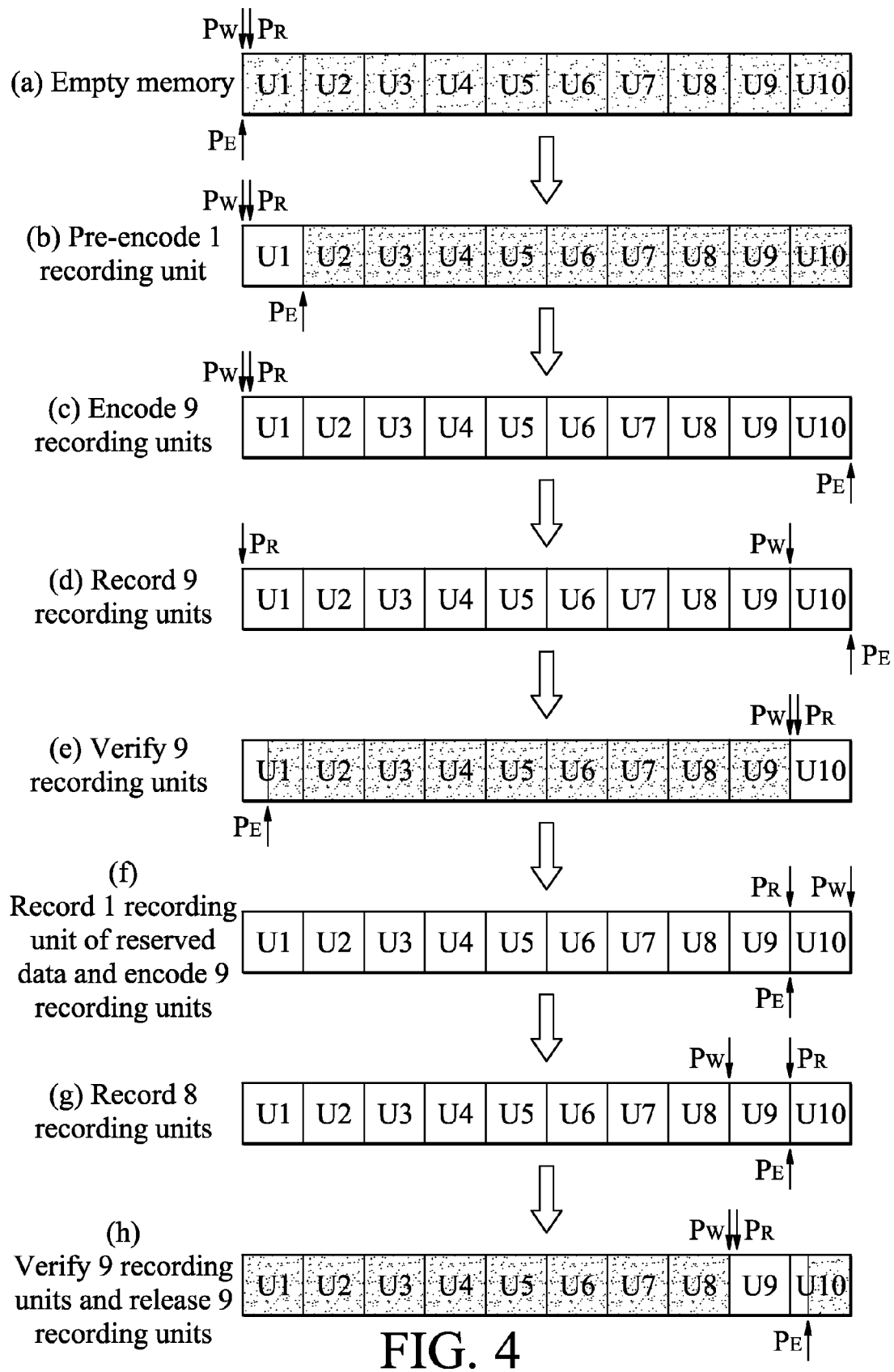
FIG. 4 is a schematic diagram of data store in a memory of an optical disk drive according to the method shown in FIG. 3.

FIG. 4 shows a schematic diagram of data store in the memory 213 according to the method shown in FIG. 3. Assume that the memory 213 has a capacity of 10 recording units U1~U10. The write pointer $P_W$ represents a starting position for a recording process to retrieve data for recording from the memory 213, the release pointer $P_R$ represents a starting position for the memory 213 to release data which has been recorded, and the encode pointer $P_E$ represents a starting position for the memory 213 to store newly encoded data. The memory 213 is originally empty in FIG. 4(a), and a write pointer $P_W$, a release pointer $P_R$, and an encode pointer $P_E$ are all pointed to a starting point of a first recording unit U1. The encoder 214 then pre-encodes raw data to obtain a recording unit with encoded data to be stored in the first recording unit U1 (step 302), and the encode pointer $P_E$ is pointed to a starting point of a second recording unit U2, as shown in FIG. 4(b). The encoder 214 then continues to encode raw data to generate 9 recording units with encoded data to be stored in the recording units U2~U10 (step 304), and the encode pointer $P_E$ is pointed to an end point of the recording unit U10, as shown in FIG. 4(c).

Because the memory 213 shown in FIG. 4(c) is full of encoded data, the control unit 210 can start to record the encoded data to the optical disk 206. Meanwhile, once the pickup head 218 records encoded data for a first recording iteration (step 306), the control unit 210 drives the pickup head 218 to move to a write target position on the optical disk 206 (step 308). The pickup head 218 then records the encoded data stored in the memory 213 to the optical disk 206 (step 310). When an amount of the encoded data which has not been recorded to the optical disk 206 is equal to the predetermined number of recording units when pre-encoded at step 302 (step 312), the control unit 210 drives the pickup head 218 to stop recording of the encoded data, thus reserving the predetermined number of recording units of the encoded data in the memory 213 as reserved data without being recorded onto the optical disk 206 (step 313). As shown in FIG. 4(d), 9 recording units U1·U9 with encoded data have been recorded (step 310), a recording unit with encoded data U10 is reserved in the memory 213 without being recorded onto the optical disk 206 (step 313), and the write pointer $P_W$ is pointed to an end point of the recording unit U9.

The control unit 210 drives the pickup head 218 to move back to the write target position on the optical disk 206 (step 314) after recording of the encoded data at steps 310-313 is completed, and the pickup head 218 starts to read the recorded data from the optical disk 206. The verify unit 216 then compares the recorded data with the corresponding encoded data stored in the memory 213 to verify correctness of the recorded data (step 316). After the encoded data is verified, the memory 213 clears the encoded data stored therein (step 318). As shown in FIG. 4(e), the encoded data U1·U9 which has been recorded onto the optical disk 206 is verified at step 316 and cleared at step 318 except for the reserved data U10, and the release pointer $P_R$ is also pointed to an end point of the recording unit U9.

After recorded data in the prior recording iteration has been verified, the pickup head 218 is at a write target position of a subsequent recording iteration. Because at least one recording unit with encoded data U10 is previously reserved as reserved data in the memory 213 without been recorded at step 313, the control unit 210 drives the pickup head 218 to record the reserved data U10 onto the optical disk 206 without moving the pickup head 218 (step 319). Thus, a recording target seek step for moving the pickup head to the write target position corresponding to a next recording iteration is omitted to reduce the required time of data recording, thus improving performance of the optical disk drive 204.

Because there is still raw data waiting to be encoded (step 320), the next recording iteration is continued, and another 9 recording units U1~U9 with encoded data are encoded at step 304 and stored in the memory 213. As shown in FIG. 4(f), the write pointer $P_W$ is pointed to an end point of the recording unit U10, and the encode pointer $P_E$ is pointed to an end point of the recording unit U9. The pickup head 218 then continues to record the encoded data U1~U9 on the optical disk 206 at step 310 without performing the recording target seek step 308. As shown in FIG. 4(g), the encoded data U10 and U1~U8 is recorded onto the optical disk 206, leaving a recording unit with encoded data U9 as the reserved data. After the 9 recording units of recorded data U10 and U1~U8 is verified at step 316, the memory 213 clears the recorded data U10 and U1~U8 for holding new encoded data, as shown in FIG. 4(h), which is similar to FIG. 4(e).

Another embodiment of a method for data recording of an optical disk drive is also provided. First, raw data is encoded to obtain a plurality of recording units of encoded data to be stored in a memory. The encoded data stored in the memory is then recorded onto an optical disk except for a reserved portion of the encoded data. The encoded data is then released from the memory except for the reserved portion. In one embodiment, the data amount of the reserved portion is equal to a segment of previously encoded data obtained from a pre-encoding process or left without being recorded in a previous recording process.

Figure 5A:
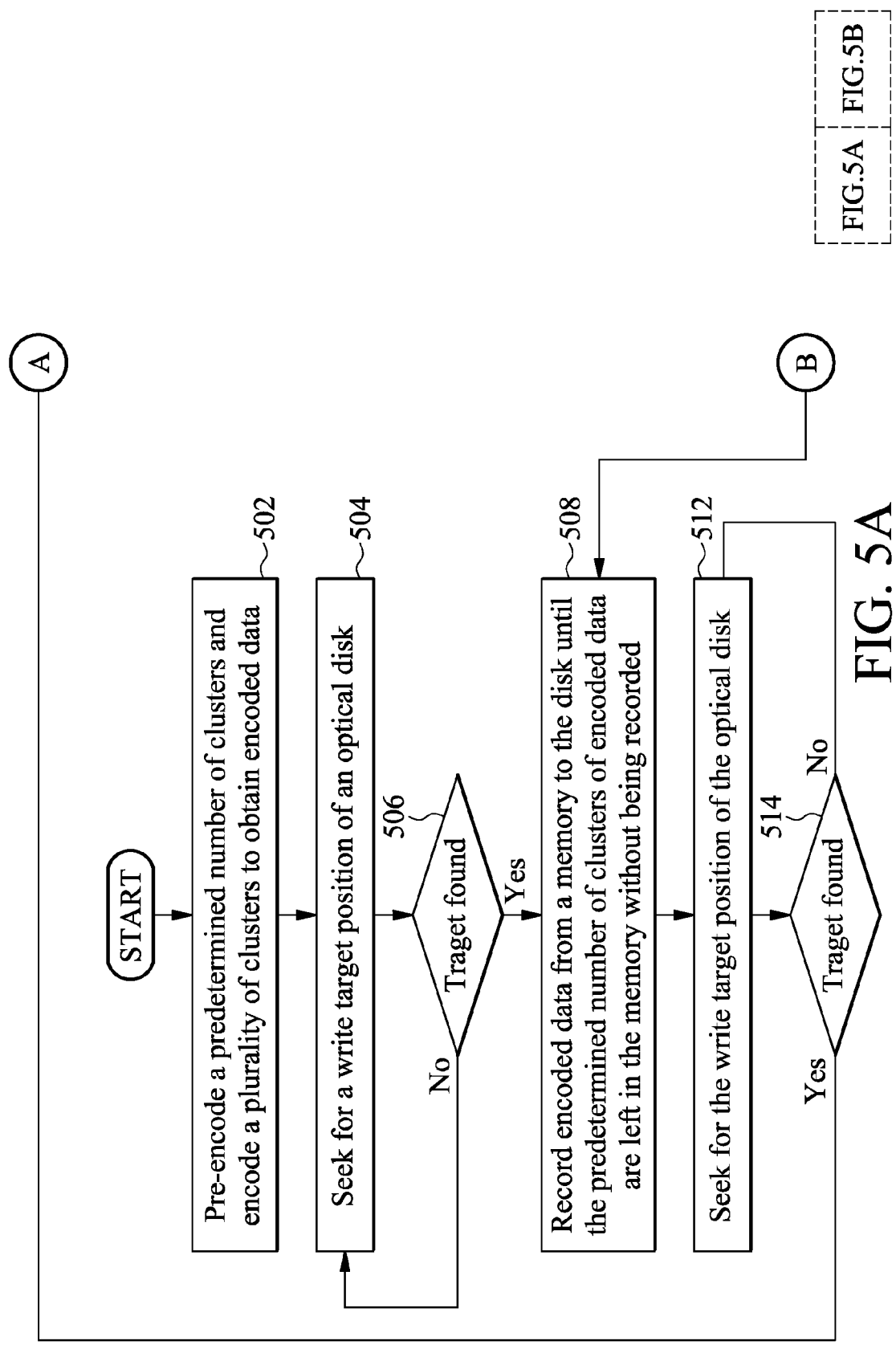
FIG. 5 is a flowchart of another embodiment of a method for data recording of an optical disk drive.
Figure 5B:
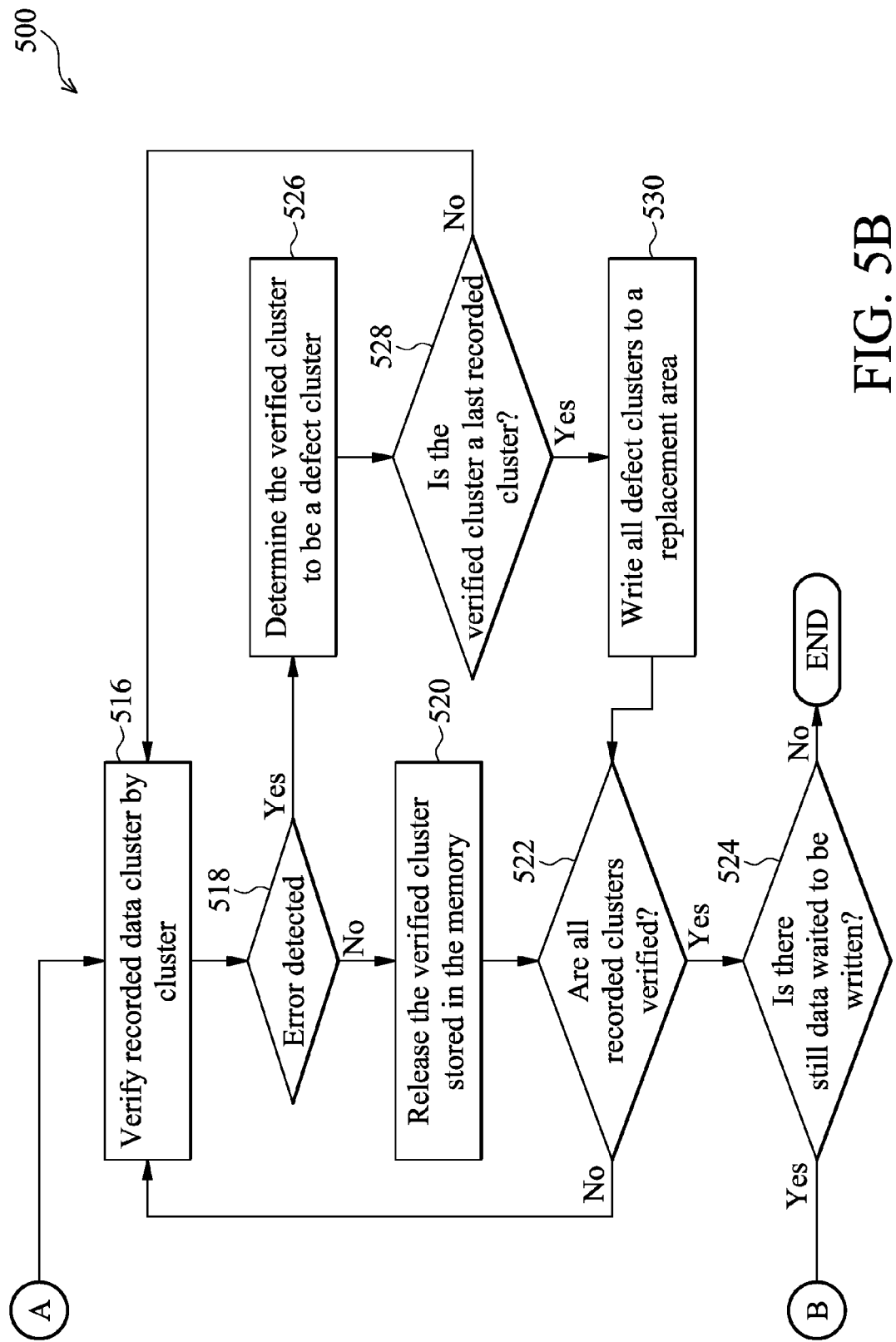

Referring to FIG. 5, a flowchart of another embodiment of a method 500 for data recording of the optical disk drive 200 is shown. When the optical disk 206 is a blu-ray disk, the recording unit is an ECC cluster. An encoder 214 first pre-encodes a predetermined number of clusters and encodes a plurality of clusters to obtain encoded data stored in a memory 213 (step 502). The pickup head 218 then seeks for a write target position of the optical disk 206 (step 504). When the write target position is found (step 506), the pickup head 218 records encoded data stored in the memory 213 to the optical disk 206 until the predetermined number of clusters of encoded data are left in the memory 213 without being recorded (step 508). The clusters of encoded data left in the memory 213 without being recorded are referred to as reserved data. The pickup head 218 then seeks for the write target position of the optical disk 206 (step 512). When the write target position is found (step 514), the pickup head 218 starts to read the recorded data from the optical disk 206, and a verify unit 213 verifies the recorded data cluster by cluster according to the encoded data stored in the memory 213 (step 516).

When no recording errors are detected in the recorded data (step 518), the memory 213 releases the verified cluster stored in the memory 213 (step 520). After a verified cluster is cleared, the encoder 214 generates new encoded data to be stored in the memory 213. Otherwise, when recording errors are detected in the recorded data (step 518), the verify unit 213 determines the verified cluster to be a defect cluster (step 526). If the verified cluster is a last recorded cluster (step 528), the pickup head 218 writes all defect clusters previously determined by the verify unit 213 to a replacement area of the optical disk 206 (step 530). Otherwise, the control unit 210 determines whether all of the recorded clusters of the current recording iteration has been verified by the verify unit 213 (step 522). If so, when there is still new encoded data waiting to be written to the optical disk 206, data recording is not completed, and the pickup head records the new encoded data to the optical disk 206 (step 508) for a next recording iteration.

Figure 1:
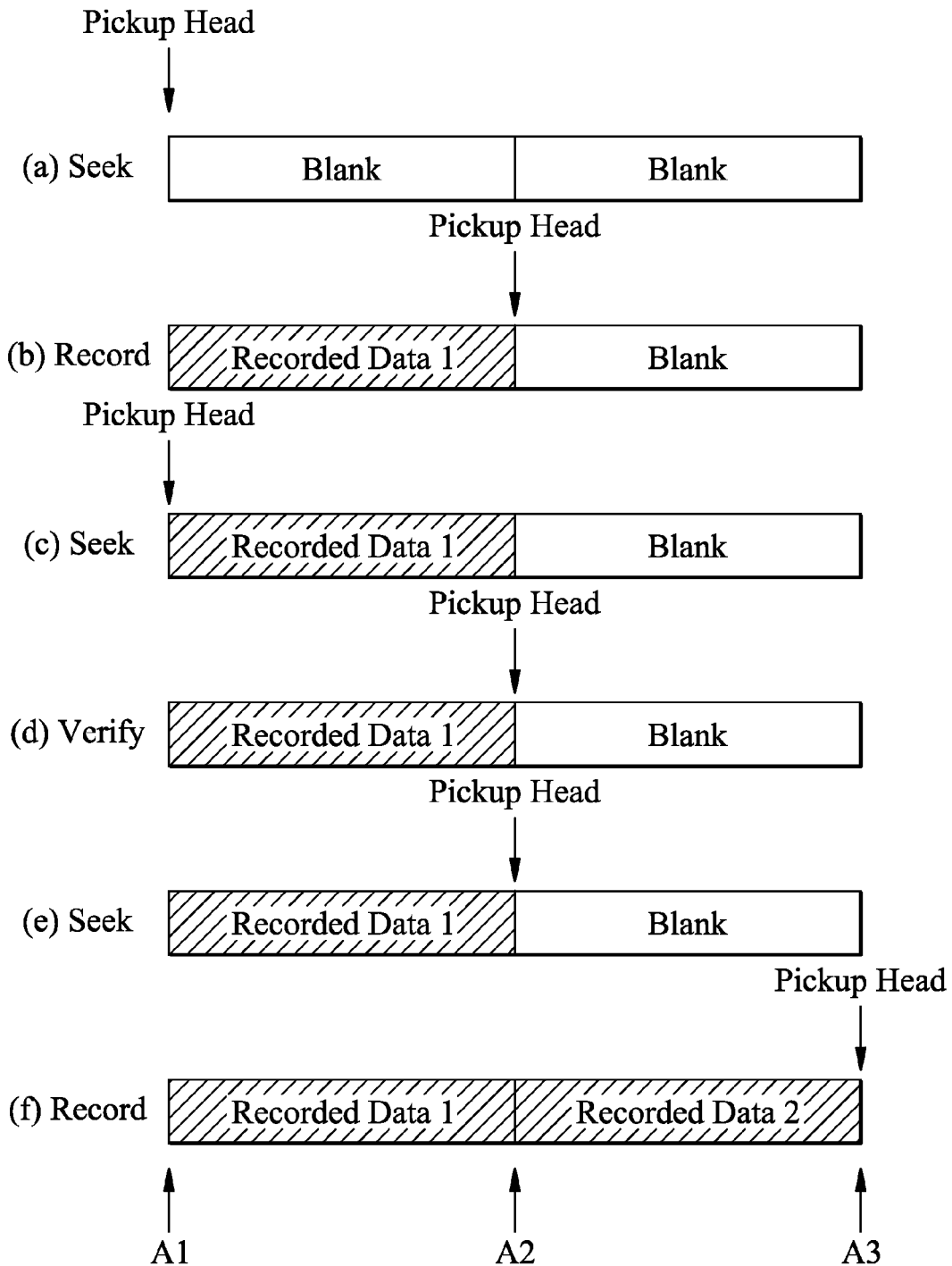
FIG. 1 is a schematic diagram of a conventional recording process.

The encoded data for recording is stored in a memory and cannot be cleared until recorded data corresponding to the encoded data is verified according to the encoded data. According to the embodiments of a seamless-verify-write method provided by the invention, the memory storage area holding the encoded data has a large size, the memory can hold a greater amount of encoded data, and a greater amount of encoded data is therefore recorded on a disk in each recording iteration. The recording step is therefore allowed a greater time period, and encoding of a subsequent encoded data segment can be simultaneously performed during recording of a prior encoded data segment. On the contrary, in the conventional recording process shown in FIG. 1, the memory storage area holding the encoded data has a smaller size, the memory holds a less amount of encoded data, and a less amount of encoded data is therefore recorded on a disk in each recording iteration. Therefore, there is no such a greater time period as mentioned above in the recording step, and at least one recording unit of a subsequent encoded data segment cannot be generated during recording of a prior encoded data segment. When no more than a recording unit of a subsequent encoded data segment is encoded, the optical disk drive cannot have enough time to record the subsequent encoded data segment after verification of a prior recorded data segment is completed. The pickup head therefore drifts away from the write target position, and an extra recording-target seek step is therefore required to move the pickup head to a write target position before the subsequent encoded data segment is recorded, increasing required time for a recording process and degrading performance of the optical disk drive. Thus, the seamless-verify-write process provided by the invention has a better performance than the conventional recording process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
an encoder, encoding raw data received from a host to obtain encoded data;
a verify unit, after the encoded data is recorded onto an optical disk, comparing the recorded data read from the optical disk with the encoded data to identify recording errors;
a control unit, reserving at least one recording unit of a prior segment of the encoded data as reserved data without being recorded onto the optical disk when the prior segment of the encoded data is recorded, and recording the reserved data onto the optical disk as an initial portion of a subsequent segment of the encoded data after reading of the recorded prior segment of the recorded data is completed;
a memory, controlled by the control unit, storing the encoded data, and clearing the encoded data after the encoded data is recorded onto the optical disk; and
a pickup head, controlled by the control unit, recording the encoded data on the optical disk, and reading recorded data from the optical disk for the verify unit, wherein the control unit directs the encoder to pre-encode at least one recording unit of the encoded data to be stored in the memory, directs the encoder to encode a fixed amount of encoded data to be stored in the memory in each recording iteration, and drives the pickup head to record the fixed amount of the encoded data to the optical disk in each recording iteration, thus leaving at least one recording unit of the encoded data in the memory as the reserved data without being recorded onto the optical disk during each recording iteration.

2. The optical disk drive as claimed in claim 1, wherein the reserved data is a segment of previously encoded data obtained from a pre-encoding process or left without being recorded in a previous recording process.

3. The optical disk drive as claimed in claim 1, wherein when the verify unit determines recording errors in a recording unit of the recorded data, the recording unit of the recorded data with recording errors is marked as a defected data unit and then written to a replacement area of the optical disk.

4. The optical disk drive as claimed in claim 1, wherein the optical disk is a blue-ray disk (BD), and the recording unit is an error-correction-code (ECC) cluster.

5. The optical disk drive as claimed in claim 1, wherein the optical disk is a compact disk (CD), and the recording unit is a sector.

6. The optical disk drive as claimed in claim 1, wherein the optical disk is a digital versatile disk (DVD) or a high-density digital versatile disk (HD-DVD), and the recording unit is an error-correction-code (ECC) block.

7. The optical disk drive as claimed in claim 1, wherein the memory is a dynamic random access memory (DRAM), a static random access memory (SRAM), or a flash memory.

8. The optical disk drive as claimed in claim 1, wherein the optical disk drive further comprises a memory controller, handling data access of the memory from the encoder and the verify unit.

9. The optical disk drive as claimed in claim 8, wherein the optical disk drive further comprises a host interface, coupled between the host and the memory controller, transmitting data between the host and the memory.

10. The optical disk drive as claimed in claim 9, wherein the host interface is a SATA interface.

* * * * *